Patented Feb. 13, 1940

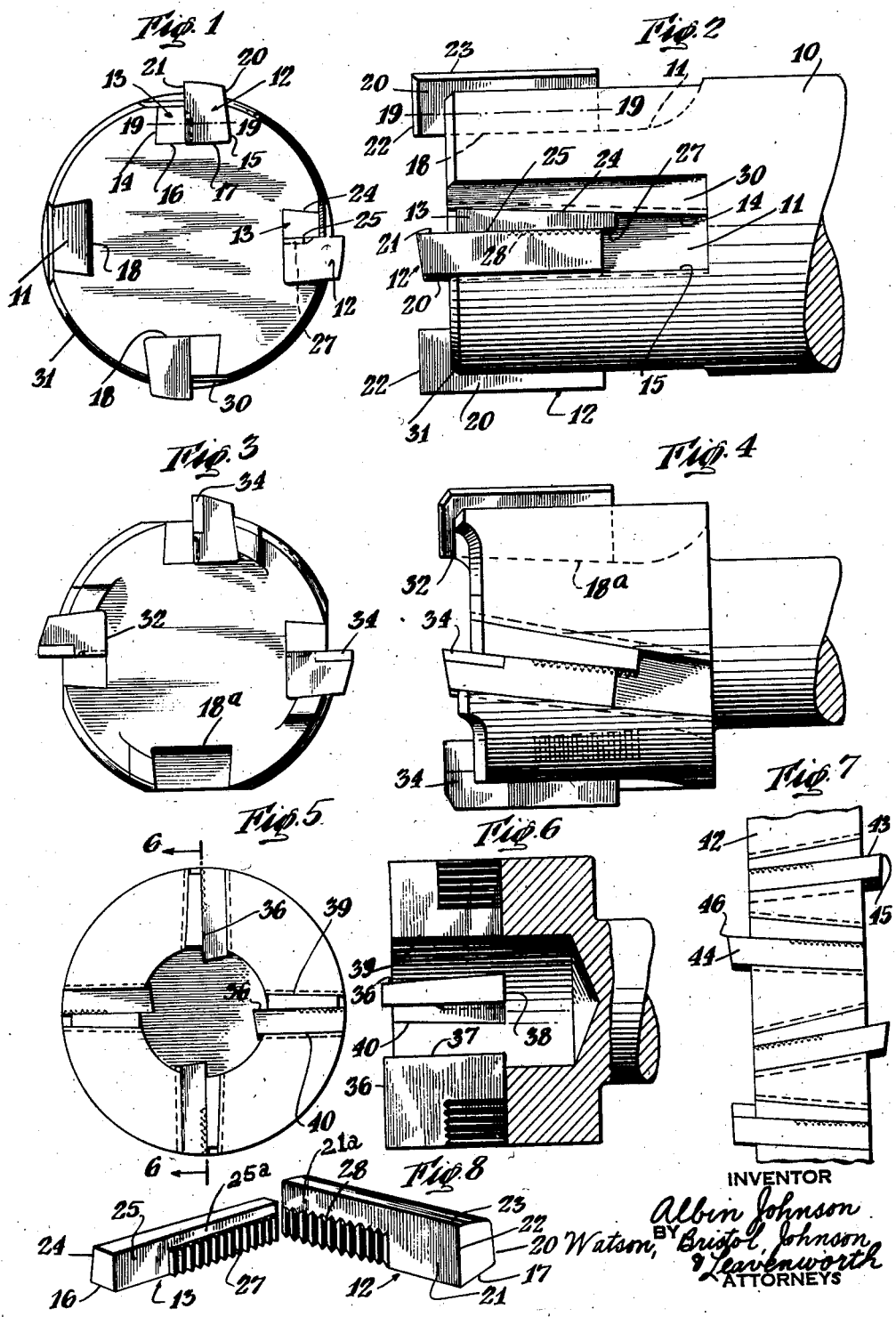

2,189,801

UNITED STATES PATENT OFFICE 2,189,801

INSERTED BLADE CUTTER TOOL

Albin Johnson, Detroit, Mich.

Application July 16, 1937, Serial No. 153,910

5 Claims. (Cl. 29—105)

This invention relates to cutting tools of the inserted blade type. Its purpose is to provide a cutter tool of such type which is exceptionally well adapted to withstand the enormous strains imposed thereon by the severe conditions of present-day usage. Ability to meet the demands for increased production and accuracy of finished product is dependent upon the character of the cutting tool; and has been advanced only so far as permitted by the capacity of cutting tools heretofore available. In the efforts to meet these conditions there have been proposed heretofore a great variety of wedge means and interlocking devices, including serrations, only a few of which proposals, however, have been found of practical use.

The present invention comprises an arrangement and combination of elements different from any of these prior proposed constructions, which cooperate to produce a cutter tool with self-locking blades of remarkable strength and rigidity, and in which the blades are not only self-locking and capable of adjustment but afford assurance that each blade will retain its selected adjusted position even under extremely severe conditions of operation.

In accordance with the principles of this invention, the inserted blade means comprises a composite blade member and wedge member, the combined shape of which, in conjunction with a corresponding opening in the support, forms a compound wedge and dovetail means. On the adjacent surfaces of the blade and wedge members are located complemental interlocking means designed to cause the two members to function in effect as one, and to be urged conjointly under the forces encountered in operation into firm locking position. The exterior surfaces of the composite blade means, where they contact with the walls of the slot, all comprise flat plane areas. Accordingly, the initial assembling of the blade means in the cutter, the parts slide easily into the final wedged position and the cutting forces act automatically to urge the members into more firm engagement and to maintain them in such position. In this respect it is to be noted that the inner edge surfaces of the blade and wedge members are continuously in contact with a flat surface of the supporting body, and are so maintained by the compound wedging and dovetail means. As stated, all of the exterior surfaces, where support is had on the walls of the slot, are smooth flat surfaces, and this is likewise true as to surfaces between the blade and wedge members adjacent the cutting edges. As a consequence the blade members are supported in all directions by smooth solid surfaces, and there is no loosening or displacement of the blades due to serrations or irregular surfaces breaking down under the severe forces imposed thereon.

The complemental interlocking means between adjacent surfaces of the two members permit selective positioning of the blade member with respect to the wedge member, which causes the blade to project to a correspondingly greater or lesser degree from the supporting body when the two members are assembled in the slot. This permits adjustment of the blade to compensate for wear and regrindings of the cutting edge, or for any other desired purpose such as to change the cutting dimension of the cutter tool as a whole, in the case particularly of rotary cutters. In all adjusted positions the cutter blade receives the same rigid permanent support described generally above.

The principles of the invention are applicable in various types of tools, as will be seen in part from the specific applications hereinafter described.

The invention accordingly comprises the features of construction, combination of elements, and arrangement of parts, which will be exemplified in the construction hereinafter set forth and the scope of which invention will be indicated in the claims.

For a fuller understanding of the nature and objects of the invention reference should be had to the following detailed description taken in connection with the accompanying drawing, in which:

Fig. 1 is an end view of a milling cutter showing the blade means incorporated therein;

Fig. 2 is a side view of the cutter of Fig. 1;

Fig. 3 is an end view of a similar type of cutter with a somewhat modified blade and slot arrangement;

Fig. 4 is a side view of the cutter of Fig. 3;

Fig. 5 is an end view of a hollow mill type of cutter with the blade construction incorporated therein;

Fig. 6 is a cross-sectional view on the line 6—6 of Fig. 5;

Fig. 7 is a view showing the periphery of a different type of cutter, commonly referred to as a slotting tool; and Fig. 8 shows in perspective the blade and wedge members such as are employed in the cutter of Figs. 1 and 2.

The invention is applicable to various types of cutter tools, either of the rotary milling type with a plurality of blades, or of the lathe type having a shank supporting member and a single cutting blade. Typical applications are shown in the drawing.

Referring first to the cutter of Figs. 1 and 2 and the blade and wedge members shown in Fig. 8, it will be seen that the milling tool in general includes a supporting body 10 having a series of slots 11 around its periphery, here shown as being four in number, but which may be varied in accordance with the size and requirements in any particular tool. Mounted in each slot is a composite cutter blade, which includes the blade member proper 12 and the wedge member 13. As appears in Fig. 2, the opposite sides 14 and 15 of the blade slot are inclined with respect to each other to form a wedge shape opening with the sides diverging outwardly toward the cutting end of the tool; and as appears in Fig. 1, the sides 14 and 15 are also inclined with respect to each other in a plane at right angles to the axis, the inclination in this case being such that the sides 14 and 15 converge in a radial direction toward the periphery. The blade and wedge combinedly, i. e., when placed adjacent each other in their normal relation, produce a composite blade means conforming in shape to the opening. In general this means that the members receive a compound wedging action in the direction of the axis and a dovetail lock radially, the two tapers serving, among other functions, to urge the inner edge surfaces 16 and 17 of the wedge and blade members respectively into firm contact with the bottom surface 18 of the slot and so maintain them.

Considering the shape of the blade and wedge members by themselves as shown in Figs. 1 and 2, and in Fig. 8, it will be seen that the blade member in longitudinal section is of uniform thickness. In other words, if a plane were passed through the blade on the lines 19—19 of Figs. 1 and 2, the lines defined by the intersection respectively of this plane with the rear or lower surface 20 of the blade and the front or upper surface 21 would be parallel. In transverse section the rear surface 20 of the blade member is inclined toward the forward surface 21 in the outward radial direction of the cutter tool as a whole. The cutting edges comprise the edges 22 and 23 respectively of the forward blade surface 21. Referring to the wedge member, in transverse or radial section, the shape is substantially similar to that of the blade member. In other words, as shown in Fig. 1, for example, the side 24 opposite the blade member is inclined toward the surface 25 adjacent the blade member, with the sides converging outwardly. In longitudinal section the wedge member differs from the blade member, in that the sides 24 and 25 of the wedge member diverge outwardly to the left as shown in Fig. 2 to form a wedge shape.

As is shown particularly in Fig. 8, the adjacent surfaces of the blade and wedge members are provided with a series of complemental formations, comprising serrations 27 on the wedge and 28 on the blade member extending transversely of the members. This serrated means serves to lock the two members firmly together in a longitudinal direction when inserted together in the cutter tool slot, but permits selective longitudinal positioning of the blade member relative to the wedge and correspondingly with respect to the supporting body. This permits the blade member to be adjusted for various purposes, particularly to be adjusted successively outward to compensate for wear and regrinding of the outer cutting edge 22. It will be noted, since the blade member is of uniform thickness in longitudinal section that, regardless of its relative longitudinal position in the supporting body, the wedge member will always occupy substantially that position shown in Fig. 2. In other words, the wedge will not protrude to an objectionable distance under some adjustments, nor will it in any case recede too far into the slot leaving an opening for chips to collect.

As a further feature in connection with these serrations, it will be noted particularly from Fig. 8 that the serrations 27 on the wedge member project from the surface 25, whereas on the blade member the serrations 28 comprise depressions below the surface 21 of the blade member. Although the serrations may, if desired, extend entirely across the wedge member, in Fig. 8 they are shown as stopping short of the outer edge leaving a flat area 25ª, complemental to the flat area 21ª on the blade member adjacent the cutting edge 23. Regardless, therefore, of the extent of outward adjustment of the blade member, there will be an area of contact between surfaces 21ª and 25ª. The serrations, in general, occupy only a portion of the contacting area between the blade and wedge members leaving extensive flat areas adapted to bear firmly against each other and to take the strain, as distinguished from the strain being imposed on the complemental serrations with the resulting loosening and displacement as the serrations gradually settle into each other. The serrations, it will be seen, merely serve as a means for locking the two members with respect to each other against relative longitudinal movement, and permit, if necessary, relative transverse movement of the cutter blade in a radial direction, which assures that the blade member, under the cutting forces imposed thereon, will automatically adjust itself to bear firmly against the bottom surface 18 of the slot.

The construction described provides an exceptionally strong, rigid support and a most rugged tool as a whole. The composite blade means is locked into position by compound wedge and dovetail means. The contacting surfaces between the blade and wedge members, on the one hand, and the supporting body, on the other hand, are flat plane surfaces, eliminating any possibility of the shifting of the members under the cutting strains. Cutting forces acting on the outer cutting edges 22 serve automatically to wedge the blades longitudinally and to urge them more firmly into engagement with the inner walls 18 of the slots. The slots in the cutter body are of generally simple form, free of serrations, which contributes materially to the ease and economy of manufacture.

It will be appreciated from a consideration of the principles of the invention, that the slots and blades may be arranged in different positions or angles, and the location and character of the cutting edges may differ, dependent upon the particular circumstances. Likewise the size and shape of the blade and wedge members may be varied to suit the particular type of cutter or the conditions. Accordingly, the reference to the member 12 as being a blade member is not intended to be in a limiting sense, but refers in general to the cutter member, sometimes termed a cutter bit, and which may assume different sizes and proportions as circumstances warrant. The serrations, it will be noted, are illustrated in relatively large proportion particularly for clarity; but these may be, and preferably would be made smaller in most cases. Smaller serrations enable finer adjustments.

Various refinements may be incorporated in the cutter tool as a whole, such as the chip clearance shown at 30 in Fig. 1 and the chamfer 31 shown in Fig. 2.

In Figs. 3 and 4 is shown a milling cutter embodying refinements or extensions of the principles of this invention. The general construction is quite similar to that of Figs. 1 and 2, but as is shown in Fig. 4 the bottom surface 18a of the blade slot is inclined to the axis of the cutter and progressively recedes away from the axis toward the outer cutting end of the tool. The inner edge surface 32 of the blade member and likewise of the wedge member are correspondingly inclined. This has the function of providing a radial adjustment of the cutter blade simultaneously with longitudinal adjustment. In other words, as the cutter blade is stepped to the left in Fig. 4 it simultaneously will be advanced outwardly in a radial direction. It is to be understood, however, that this additional taper and feature in no wise detracts from the close fit or the compound locking described in connection with the form of Figs. 1 and 2.

In Figs. 3 and 4 there is also shown a further feature and advantage inherent in the principles of this invention. As shown at 34 the cutter blades are provided with an insert of special cutting material, such as one of the cemented carbide materials. Cutter tools of this nature are intended to operate under exceptionally high forces, and accordingly the difficulty of securing the inserts in the blade members in a sufficiently strong manner, and securing the blade members in the cutter body is increased. In accordance with the present construction, the wedge member is so arranged as to overlie the insert 34 and thereby contributes very materially to resisting the forces tending to displace the insert. The fact that the serrations are so designed that the contacting surfaces between the blade and wedge members adjacent the outer cutting extremity are maintained in firm contact is especially advantageous in this connection.

A further application of the invention is shown in Figs. 5 and 6, which comprises in general a type of cutter commonly referred to as a hollow mill. As there shown, the normal cutting edges are indicated by the reference numerals 36 and 37. In this case the wedge shape diverges outwardly with respect to the slot as in the previous applications, but with respect to the axis of the cutter itself, the sides diverge inwardly. The dovetail arrangement extends substantially in the direction of the axis with the wider part of the slot shown at 38 in Fig. 6, and the sides 39 of the blade member and 40 of the wedge member converge toward each other to the left in Fig. 6. As in previous cases, the arrangement is such that the cutting forces operate on the blade and wedge means to urge them more firmly into engagement with each other and with the sides of the slot, including the bottom surface 38 of the slot.

A still further application of the invention is shown in Fig. 7, which is a fragmentary detail of a rotary cutting tool, frequently referred to as a slotting tool. In this type of cutter the cutter blades project alternately in opposite directions from the supporting body 42. The cutter blade 43 cuts on the righthand side of the slot, and the cutter blade 44 on the lefthand side of the slot, and the wedge means is arranged accordingly. In other words, cutting forces at the cutting edge 45 urge the blade 43 to the left into more firm engagement, and cutting forces at 46 urge the cutter blade 44 to the right into more firm engagement. The dovetail arrangement is substantially that shown in Figs. 1 and 3, with the wider dimension toward the axis.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. An inserted blade cutting tool comprising a supporting body having a slot therein with the opposed sides of the slot diverging in one major direction to form a wedge opening for receiving blade and wedge members, and converging outwardly in the direction transverse thereto; and cooperative blade and wedge members adapted to fit in said slot and combinedly conforming therewith the contacting areas between the blade and walls of the slot being plane surfaces for solid bearing, said blade member having an outer cutting edge insert of special cutting material and said wedge member at its outer end overlying said insert, and said members having interfitting formations on their adjacent surfaces to lock them together when wedged into said opening, said formations extending over an inner portion only of the adjacent surfaces spaced substantially from the outer edges, the remaining areas of said adjacent surfaces comprising flat planes.

2. An inserted blade cutting tool comprising a supporting body having an opening therein with the opposed sides diverging outwardly in one major direction and converging outwardly in the direction transverse thereto; and a blade member and a co-acting wedge member, said members combinedly conforming with said opening and adapted to be wedged therein, said wedge member being tapered in said major direction and said blade member being of uniform thickness in said major direction and each of said members being of dovetailed shape in said transverse direction, the adjacent surfaces of said members being provided over a portion only thereof spaced inwardly from the cutting edges with a series of serrations extending in said transverse direction for selective positioning of said blade member in said major direction with respect to said wedge member and correspondingly with respect to said slot, the remaining areas of the adjacent surfaces of said members and the bottom area of said blade being plane surfaces to provide a solid bottom support and permit the blade to receive support in said transverse direction against the corresponding inner wall of said opening.

3. A rotary inserted blade cutting tool comprising a supporting body having a series of slots therein with the opposed sides diverging outwardly in the axial direction and converging outwardly in the radial direction; and a blade member and co-acting wedge member fitted in each of said slots and combinedly conforming with the shape thereof, the contacting areas between said members and the slots being flat plane surfaces and the mutually contacting surfaces of said members comprising flat plane surfaces except for an area on each at the inner portion spaced substantially from the outer edges, said area on one member comprising a series of raised serrations extending in said radial direction and said area on the other member comprising a series of complemental depressed serrations, whereby said blade may be adjusted and supported in different positions relative to the respective slot, said serrations providing means for locking the blade in adjusted position while permitting the blade to move radially inward to seat firmly against the inner wall of the slot, the remaining surfaces between said members providing a flat plane bearing for the blade.

4. A cutter blade for inserted blade cutter tools adapted to be secured in a slot of the cutter body by a compound dovetail and wedging action, comprising an oblong member having upper and lower faces and cutting areas at the outer end and outer side edge, said member being of uniform thickness in longitudinal section, the opposed upper and lower faces being at an angle to each other in transverse direction with the faces diverging inwardly from the side cutting area, said upper face having a portion only of its area spaced inwardly from both the end and side cutting areas provided with a series of serrations extending in said transverse direction, the lower face and the remaining areas of said upper face being flat plane surfaces to provide a solid support for the blade member when fitted into a cutter body.

5. A cutter blade for inserted blade cutter tools adapted to be secured in a slot of the cutter body by a compound dovetail and wedging action, comprising an oblong member having upper and lower faces and cutting areas at the outer end and outer side edge, the width of said member increasing progressively inwardly from said outer end, and the opposed upper and lower faces being at an angle to each other in transverse direction with the faces diverging inwardly from the side cutting area, said upper face having a portion only of its area spaced inwardly from both the end and side cutting areas provided with a series of serrations extending in said transverse direction, the lower face and the remaining areas of said upper face being flat plane surfaces to provide a solid support for the blade member when fitted into a cutter body.

ALBIN JOHNSON.